United States Patent
Akutsu

(10) Patent No.: US 11,841,291 B2
(45) Date of Patent: Dec. 12, 2023

(54) POSITION CHANGING DEVICE

(71) Applicant: Honda Motor Co., Ltd., Tokyo (JP)

(72) Inventor: Susumu Akutsu, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 804 days.

(21) Appl. No.: 16/944,168

(22) Filed: Jul. 31, 2020

(65) Prior Publication Data

US 2021/0033493 A1 Feb. 4, 2021

(30) Foreign Application Priority Data

Jul. 31, 2019 (JP) ................. 2019-140635

(51) Int. Cl.
*G01M 17/007* (2006.01)
*F16H 7/02* (2006.01)

(52) U.S. Cl.
CPC ........ *G01M 17/0074* (2013.01); *F16H 7/023* (2013.01)

(58) Field of Classification Search
CPC ............. G01M 17/0074; G01M 7/027; G01M 17/045; B25J 9/1045; F16H 7/023
See application file for complete search history.

(56) References Cited

U.S. PATENT DOCUMENTS

| | | | | |
|---|---|---|---|---|
| 5,198,736 A * | 3/1993 | Azuma | ................ | B25J 9/041 901/17 |
| 5,804,932 A * | 9/1998 | Yanagisawa | ........... | B25J 9/1045 108/143 |
| 6,460,259 B1 * | 10/2002 | Naruse | ................ | G01B 5/255 33/203.14 |
| 6,564,461 B1 * | 5/2003 | Naruse | ................ | G01B 5/255 33/203.13 |
| 9,666,093 B2 * | 5/2017 | In | ........................ | G01M 17/007 |
| 11,326,986 B2 * | 5/2022 | Akutsu | ............ | G01M 17/0078 |
| 11,331,789 B2 * | 5/2022 | Penn | ..................... | B25J 9/1045 |
| 11,630,032 B2 * | 4/2023 | Akutsu | .................. | G01M 7/02 73/11.08 |
| 11,698,324 B2 * | 7/2023 | Hiramoto | .............. | G01M 7/027 73/11.08 |
| 2006/0108131 A1 * | 5/2006 | Osada | .................... | G01B 5/255 29/714 |
| 2006/0254548 A1 * | 11/2006 | Dec | ......................... | F01L 1/024 123/90.31 |
| 2022/0412838 A1 * | 12/2022 | Inagawa | ............ | G01M 17/025 |

FOREIGN PATENT DOCUMENTS

JP 5916893 5/2016

* cited by examiner

*Primary Examiner* — Bradley Duckworth
(74) *Attorney, Agent, or Firm* — JCIPRNET

(57) ABSTRACT

The disclosure provides a position changing device capable of reducing the size of the entire device in a plane. A position changing device (30) includes four pulley mechanisms (40). In the pulley mechanism (40), a toothed belt (45) is wound around a driving pulley (41) and a driven pulley (43), and is held between the driving pulley (41) and an idler roller (42) by the idler roller (42) and held between the driven pulley (43) and an idler roller (44) by the idler roller (44), and when the driving pulley (41) is driven by a driving mechanism (46), the position of a movable base plate (31) is changed.

5 Claims, 16 Drawing Sheets

POSITION CHANGING DEVICE

CROSS-REFERENCE TO RELATED APPLICATION

This application claims the priority benefits of Japanese application no. 2019-140635, filed on Jul. 31, 2019. The entirety of the above-mentioned patent application is hereby incorporated by reference herein and made a part of this specification.

BACKGROUND

Technical Field

The disclosure relates to a position changing device changing a planar position of an operation machine.

Description of Related Art

A device described in Patent Document 1 is known as a position changing device. The position changing device is applied to a driving simulation device, and includes a floor plate, a base plate, a platform, etc. The platform is connected to the base plate via a link mechanism, and a simulated vehicle serving as an operation machine is attached to an upper surface of the platform.

The base plate has a triangular shape in the plan view and is arranged on the floor plate, and portions corresponding to the vertices of the triangle are respectively connected to the floor plate via three cylinder mechanisms. In the position changing device, the base plate is driven by expanding and contracting the three cylinder mechanisms linearly, and accordingly, a planar position of the base plate, that is, a planar position of the simulated vehicle, is changed.

RELATED ART

Patent Document

[Patent Document 1] Japanese Patent No. 5916893

According to the above conventional position changing device, due to the fact that the planar positions of the base plate and the simulated vehicle are changed by the expansion and contraction operation of three cylinder mechanisms, a space in a plane that allows the three cylinder mechanisms to expand and contract is required, and the size of the device in a plane increases accordingly.

In view of the above, the disclosure provides a position changing device capable of reducing the size of the entire device in a plane.

SUMMARY

According to an embodiment of the disclosure, a position changing device 30 is provided, which changes a planar position of an operation machine (exciter 10). The position changing device includes: a base (base plate 8) having a planar upper surface; a moving member (movable base plate 31) provided on the upper surface of the base to be movable within a predetermined range of the upper surface, and the operation machine (exciter 10) being arranged at an upper portion of the moving member; and four moving mechanisms (pulley mechanisms 40) arranged on the base in a positional relationship of a quadrangular shape in a plan view to surround the moving member, and moving the moving member within the predetermined range. Each of the four moving mechanisms includes: an elongated member (toothed belt 45) having flexibility, and two ends of the elongated member being connected to the moving member; a plurality of first rotating members (driving pulley 41, driven pulley 43) arranged outside the predetermined range of the moving member on the base and wound with the elongated member, and the plurality of first rotating members being rotatable around an axis line extending in a vertical direction; a second rotating member (idler rollers 42, 44) provided to be rotatable around the axis line extending in the vertical direction, and holding the elongated member between the second rotating member and each of the plurality of first rotating members; and a driving mechanism 46 moving the moving member within the predetermined range via the elongated member by rotationally driving at least one of the plurality of first rotating members around the axis line, and stopping the moving member by stopping rotational driving.

DESCRIPTION OF THE EMBODIMENTS

Figure 1:
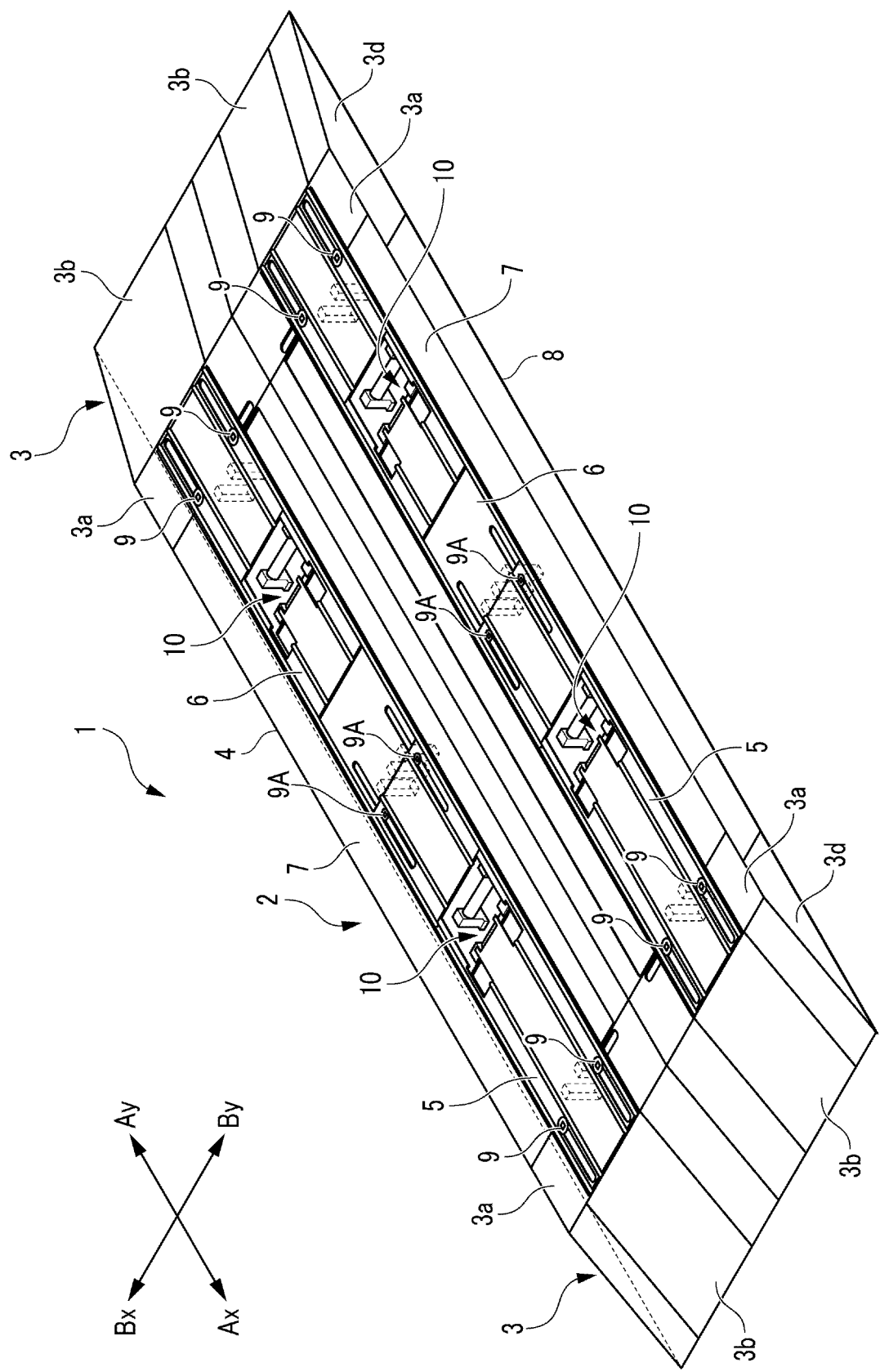
FIG. 1 is a perspective view showing an appearance of a vehicle inspection device to which a position changing device according to an embodiment of the disclosure is applied.

According to the position changing device, the four moving mechanisms for moving the moving member within the predetermined range are arranged on the base in a positional relationship of a quadrangular shape in the plan view so as to surround the moving member. Each of the four moving mechanisms includes the elongated member, the plurality of first rotating members, the second rotating member, and the driving mechanism. The elongated member has flexibility and two ends of the elongated member are connected to the moving member. Further, the elongated member is wound around the plurality of first rotating members, and is held between each of the first rotating members and the second rotating member. Then, at least one of the plurality of first rotating members is rotationally driven around the axis line by the driving mechanism so that the moving member is moved within the predetermined range via the elongated member, and the moving member stops when the rotational driving is stopped.

As described above, when moving the moving member, two ends of the elongated member that are connected to the moving member and each of the plurality of first rotating members are located at the vertices of a polygonal shape in the plan view, and the moving member is moved by changing the lengths of two sides of the polygonal shape. Accordingly, compared with a case where three cylinders extend linearly as in Patent Document 1, the planar space of the configuration required for the position change can be reduced, and the size of the entire device in the plane can be reduced.

In the position changing device 30 according to an embodiment of the disclosure, the plurality of first rotating members include three first rotating members (driving pulley 41, driven pulleys 43) that are spaced from each other and arranged to face the moving member, and the first rotating member (driving pulley 41) located at a center of the three first rotating members holds the elongated member with two second rotating members (idler rollers 42) respectively arranged on the side of remaining two first rotating members, and is rotationally driven by the driving mechanism 46.

According to the position changing device, three first rotating members are arranged to be spaced from each other and to face the moving member. The elongated member is held between the first rotating member located at the center of the three first rotating members and the two second rotating members respectively arranged on the side of the remaining two first rotating members. Thus, when the first rotating member located at the center is rotationally driven by the driving mechanism, looseness and slippage of the elongated member wound around the first rotating member is suppressed. As a result, the moving member can be reliably moved.

In the position changing device 30 according to an embodiment of the disclosure, each of the plurality of first rotating members includes a toothed pulley (driving pulley 41, driven pulley 43), the elongated member includes a toothed belt 45 that meshes with the toothed pulley, and the second rotating member includes a roller (idler rollers 42, 44) holding the toothed belt between the roller and the toothed pulley.

According to the position changing device, since the toothed belt is held between the toothed pulley and the roller while meshing with the toothed pulley, when the toothed pulley is rotationally driven by the driving mechanism, looseness and slippage of the toothed belt wound around the toothed pulley while meshing with the toothed pulley can be reliably suppressed. Thus, the moving member can be moved more reliably.

In the position changing device 30 according to an embodiment of the disclosure, the moving member (movable base plate 31) includes a magnetic substance, and the position changing device further includes a magnet mechanism (magnet clamp 32) provided on the base (base plate 8) and fixing the moving member to the base at any position within the predetermined range with a magnetic force and releasing the fixing.

According to the position changing device, the moving member is made of a magnetic substance, and the magnet mechanism is capable of fixing the moving member to the base at any position within the predetermined range with the magnetic force, and capable of releasing the fixing. Therefore, after the moving member is moved to any position within the predetermined range, the moving member can be easily fixed to the base at that position with the magnetic force of the magnet mechanism. Further, by releasing the fixing, the fixing position of the moving member to the base can be changed easily.

In the position changing device 30 according to an embodiment of the disclosure, the operation machine is an exciter 10 that excites each of a plurality of wheels W in a vehicle V including the plurality of wheels W, and the position of the exciter 10 is changed to a position corresponding to an interval between the plurality of wheels W.

According to the position changing device, the exciter that excites each of the plurality of wheels can be easily changed to a position corresponding to the interval between the plurality of wheels.

Hereinafter, a position changing device according to an embodiment of the disclosure will be described with reference to the drawings. The position changing device of the present embodiment is applied to a vehicle inspection device 1 for inspecting a vehicle V (see FIG. 18), and the vehicle inspection device 1 is provided with four exciters 10 and four position changing devices 30 (see the figures). A planar position of each exciter 10 is changed by the respective position changing device 30 as described later.

In the vehicle inspection device 1, as described later, four wheels W (see FIG. 8 and FIG. 11) of the vehicle V to be inspected are excited by the four exciters 10 respectively, thereby inspecting the vehicle V for abnormal noise or the like. In the following description, for convenience, the Ax side of the arrow Ax-Ay in FIG. 1 is called "front", the Ay side is called "rear", the Bx side of the arrow Bx-By is called "left", the By side is called "right", the upper side is called "top", and the lower side is called "bottom".

Figure 2:
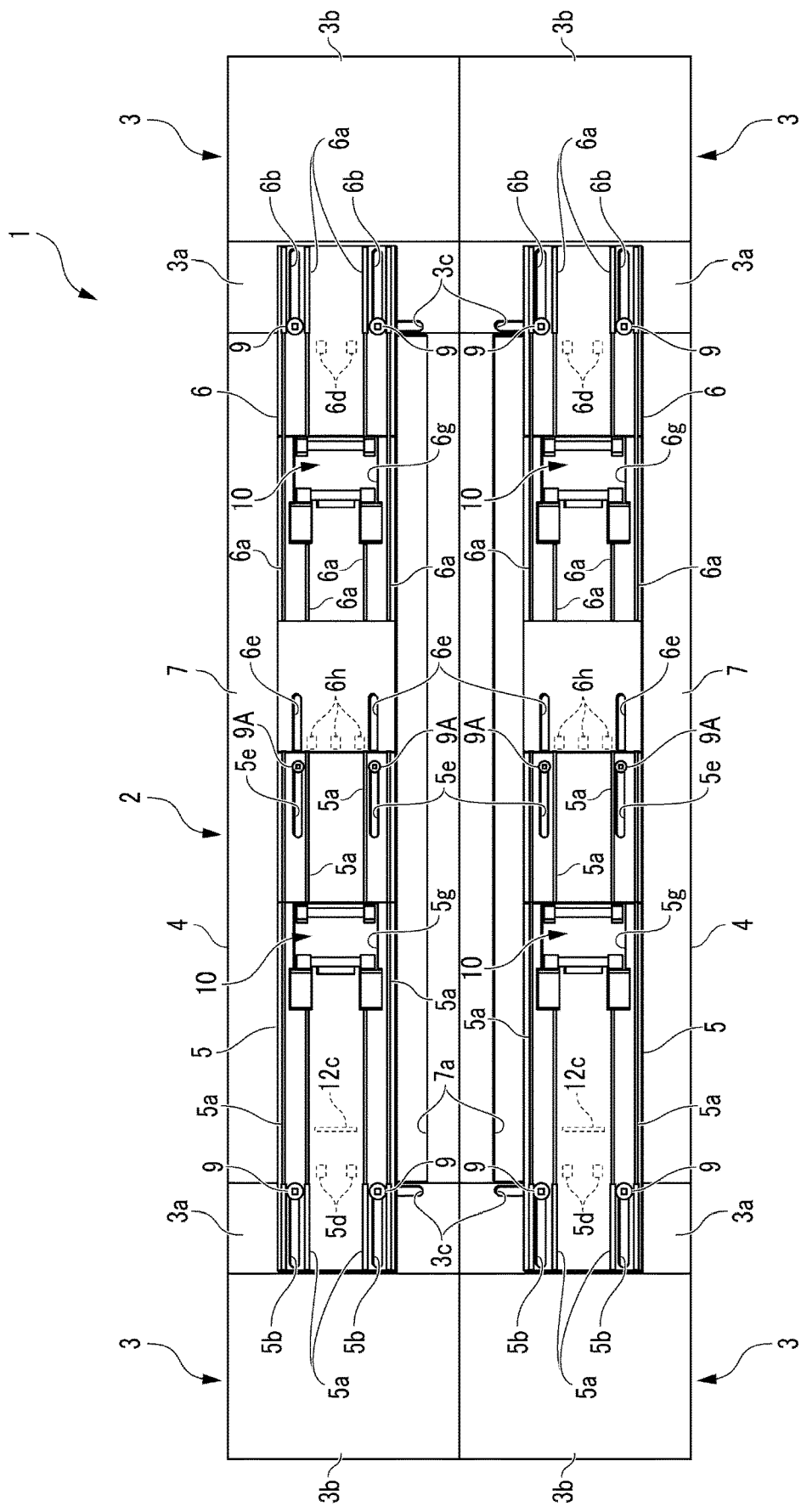
FIG. 2 is a plan view showing a state where a tread corresponding interval and a wheelbase corresponding interval between four exciters are set to maximum values.
Figure 3:
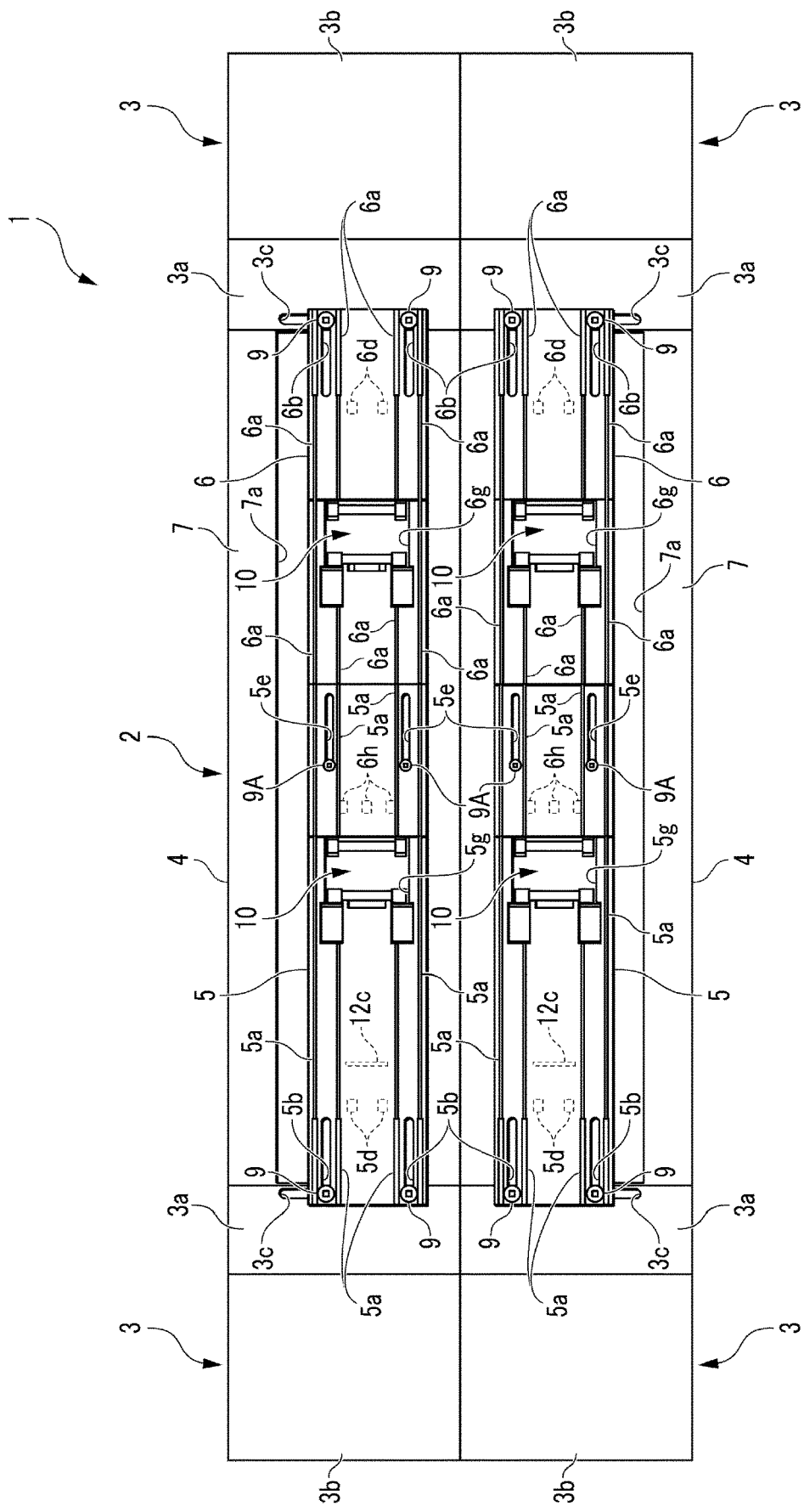
FIG. 3 is a plan view showing a state where the tread corresponding interval and a wheelbase corresponding interval between the four exciters are set to minimum values.

The vehicle inspection device 1 includes a mounting table 2 for mounting the vehicle V at the time of inspection. The mounting table 2 is installed on a floor surface (not shown), and is located below a minimum ground clearance portion of the vehicle V at the time of inspection. Since the left half and the right half of the mounting table 2 are configured to be plane-symmetric, as shown in FIG. 1 to FIG. 3, the left half is described as an example hereinafter.

The left half of the mounting table 2 includes a mounting part 4 that has a rectangular shape in the plan view and extends in a front-rear direction, and front and rear slope parts 3 provided before and after the mounting part 4. The front slope part 3 defines a flat part 3a and an inclined surface 3b. A surface of the flat part 3a is continuous with the front end of the mounting part 4. The inclined surface 3b is continuous with the flat part 3a and extends obliquely downward to the front.

A long hole 3c is formed in the flat part 3a. The long hole 3c has a predetermined width in the front-rear direction and extends at a predetermined length in a left-right direction with a predetermined interval between the long hole 3c and an edge of an opening 7a (will be described later) of a top plate 7, and two ends of the long hole 3c are formed in a semicircular shape in the plan view.

A plurality of supports (not shown) are provided inside the front slope part 3. The upper ends of these supports are fixed to the flat part 3a and the inclined surface 3b, and the lower ends thereof are fixed to the bottom surface part 3d of the slope part 3. Thus, a force acting on the front slope part 3 from above is supported by these supports.

In addition, the rear slope part 3 defines a flat part 3a and an inclined surface 3b. A surface of the flat part 3a is continuous with the rear end of the mounting part 4. The inclined surface 3b is continuous with the flat part 3a and extends obliquely downward to the rear. A long hole 3c is also formed in the flat part 3a, and the long hole 3c is configured similarly to the long hole 3c of the front slope part 3. A plurality of supports (not shown) similar to those of the front slope part 3 are also provided inside the rear slope part 3.

The vehicle V moves from the floor surface onto the mounting part 4 via the rear slope part 3 when the inspection is started, and moves from the mounting part 4 to the floor surface via the front slope part 3 after the inspection is completed.

In addition, the mounting part 4 includes front and rear mounting plates 5 and 6, the top plate 7, a base plate 8, etc. in order from top to bottom. The base plate 8 (base) has a flat plate shape that extends in the front-rear direction in a rectangular shape in the plan view. The front and rear ends of the base plate 8 are integrally fixed to the front and rear slope parts 3. The base plate 8 is mounted on the floor surface and is firmly fixed to a floor F (see FIG. 8) via a fixture (not shown; for example, an anchor bolt).

The top plate 7 has a rectangular shape in the plan view and extends in the front-rear direction, and the top plate 7 is arranged in parallel to the base plate 8. The top plate 7 is provided with the opening 7a. The opening 7a is arranged at the center of the top plate 7 and is formed in a rectangular shape that is horizontally long in the plan view, and the opening 7a penetrates the top plate 7 in a vertical direction.

The front mounting plate 5 has a rectangular shape that is horizontally long in the plan view and extends in the front-rear direction, and four ribs 5a are provided on a surface of the front mounting plate 5. The four ribs 5a extend in the front-rear direction, and the two ribs 5a on the inner side define a traveling path and have a function of guiding the wheels W of the vehicle V. Thus, at the time of inspection, the wheels W are guided by the front mounting plate 5 as the vehicle V rides on the mounting table 2 and moves to an inspection position (see FIG. 18).

A front end of the front mounting plate 5 is mounted on the flat part 3a of the front slope part 3, and a pair of long holes 5b are formed between the two ribs 5a at the left and right ends. The long holes 5b extend in the front-rear direction in parallel to each other. The front end of the front mounting plate 5 is fixed to the front slope part 3 via a hydraulic clamp device 9 at the edges of the long holes 5b.

Figure 4:
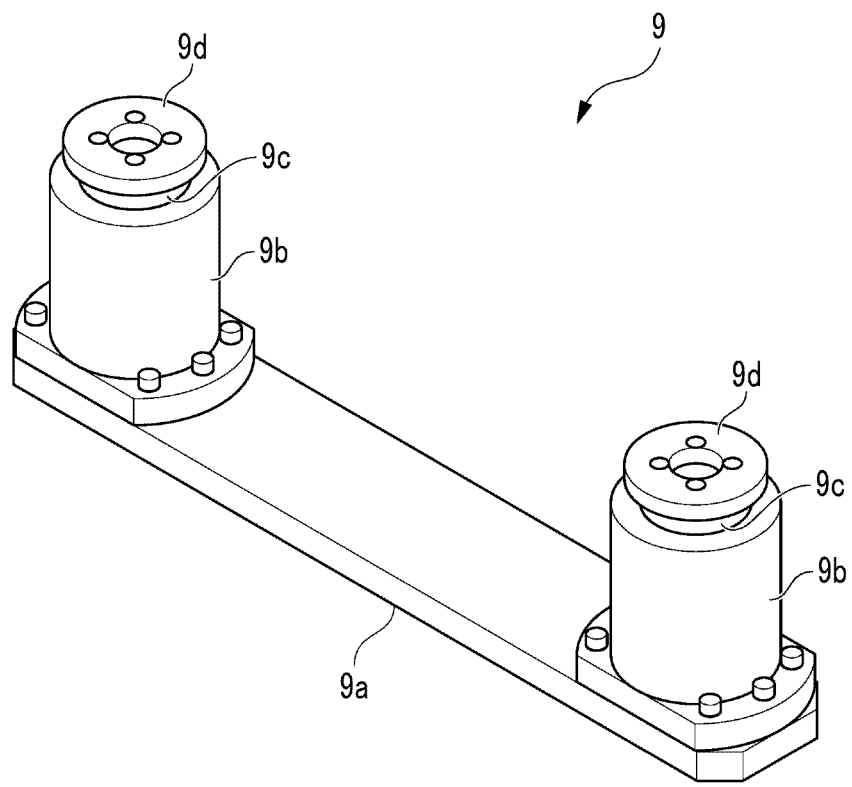
FIG. 4 is a perspective view showing a configuration of a hydraulic clamp device.

As shown in FIG. 4, the hydraulic clamp device 9 includes a connecting plate 9a and two hydraulic cylinders 9b, and the hydraulic cylinders 9b are screwed to the upper surface of the connecting plate 9a.

Each hydraulic cylinder 9b is provided with a piston rod 9c, and a flange 9d is integrally provided at the upper end of the piston rod 9c. In the hydraulic clamp device 9, the hydraulic pressure supplied from a hydraulic circuit (not shown; will be described later) to the hydraulic cylinder 9b is controlled by a control device (not shown), by which the piston rod 9c expands/contracts from the hydraulic cylinder 9b in the vertical direction.

In the case of the hydraulic clamp device 9, the front mounting plate 5 and the flat part 3a of the front slope part 3 are held between the lower surface of the flange 9d and the upper end surface of the hydraulic cylinder 9b in a state where each piston rod 9c is fitted into the long hole 5b of the front mounting plate 5 and the above-described long hole 3c of the front slope part 3. Thus, the front mounting plate 5 is fixed to the front slope part 3.

Further, in this state, the piston rod 9c extends relatively upward from the hydraulic cylinder 9b to release the fixing of the front mounting plate 5 to the front slope part 3. In such a state where the fixing of the front mounting plate 5 to the front slope part 3 is released, the piston rod 9c can move in the left-right direction while being guided by the long hole 3c of the front slope part 3 so the front mounting plate 5 can move in the left-right direction by the length of the long hole 3c. Specifically, the front mounting plate 5 is configured to be movable in the left-right direction between a maximum width position shown in FIG. 2 and a minimum width position shown in FIG. 3.

In addition, the rear end of the front mounting plate 5 is mounted on the upper surface of the front end of the rear mounting plate 6, and a pair of long holes 5e are formed at the left and right ends. Each of the long holes 5e has the same length in the front-rear direction as each of the long holes 5b, and the center line extending in the front-rear direction is arranged on the same straight line as the center line of each long hole 5b.

A piston rod (not shown) of a hydraulic clamp device 9A is fitted into each long hole 5e, and the piston rod is also fitted into a long hole 6e of the rear mounting plate 6 (will be described later). The hydraulic clamp device 9A is configured similarly to the above-described hydraulic clamp device 9 except that the hydraulic clamp device 9A is slightly smaller in size, and therefore a description thereof will be omitted.

With the above configuration, in a state where the fixing of the hydraulic clamp devices 9 and 9A is released, an edge of the long hole 5b of the front mounting plate 5 can move along the piston rod 9c of the hydraulic clamp device 9, and an edge of the long hole 5e of the front mounting plate 5 can move along the piston rod of the hydraulic clamp device 9A.

Thus, the front mounting plate 5 can move in the front-rear direction relative to the front slope part 3 by the lengths of the long holes 5b and 5e in the front-rear direction. Specifically, the front mounting plate 5 is configured to be movable in the front-rear direction between a maximum length position shown in FIG. 2 and a minimum length position shown in FIG. 3.

Figure 5:
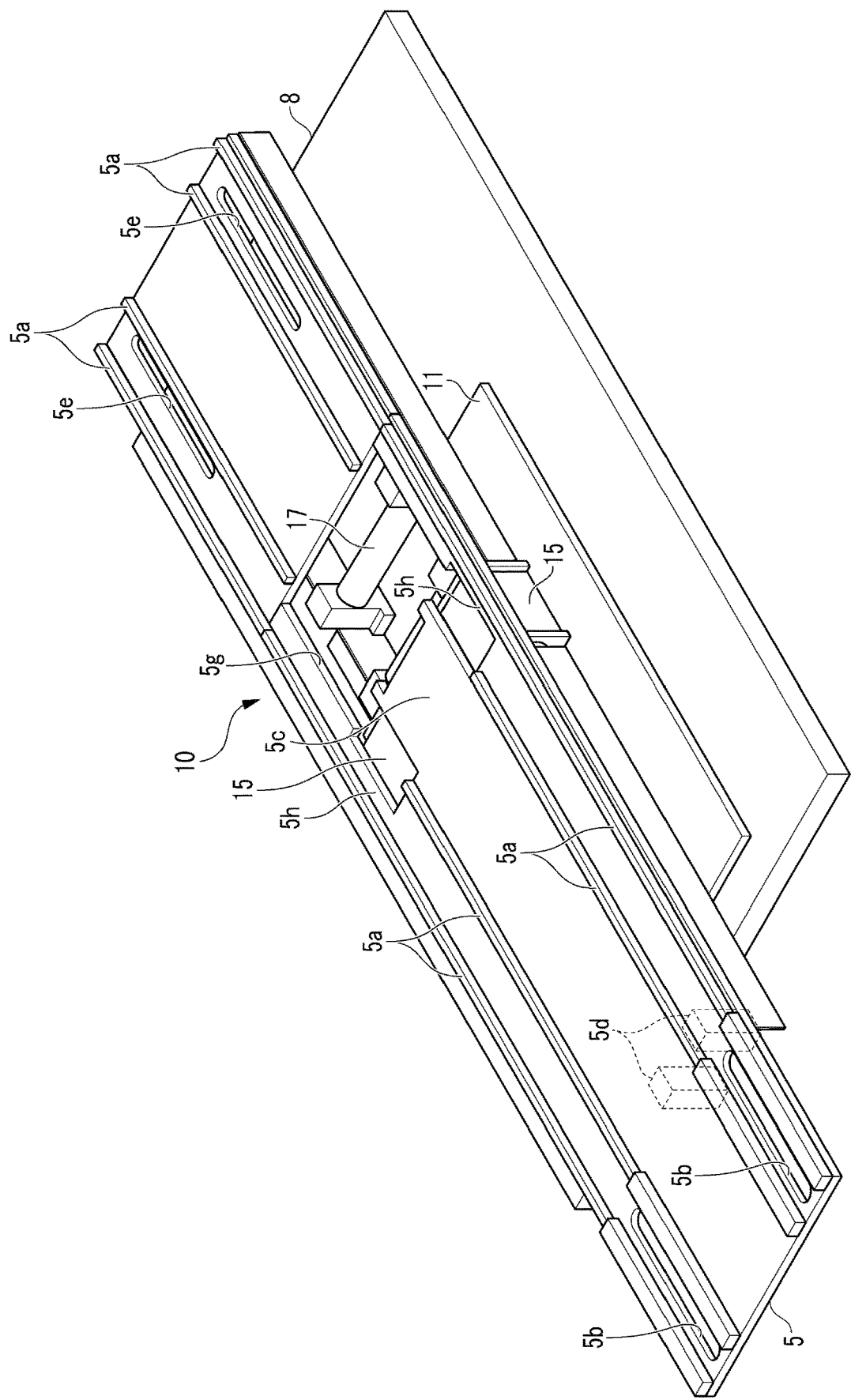
FIG. 5 is a perspective view showing a configuration of a front mounting plate and an exciter.
Figure 6:
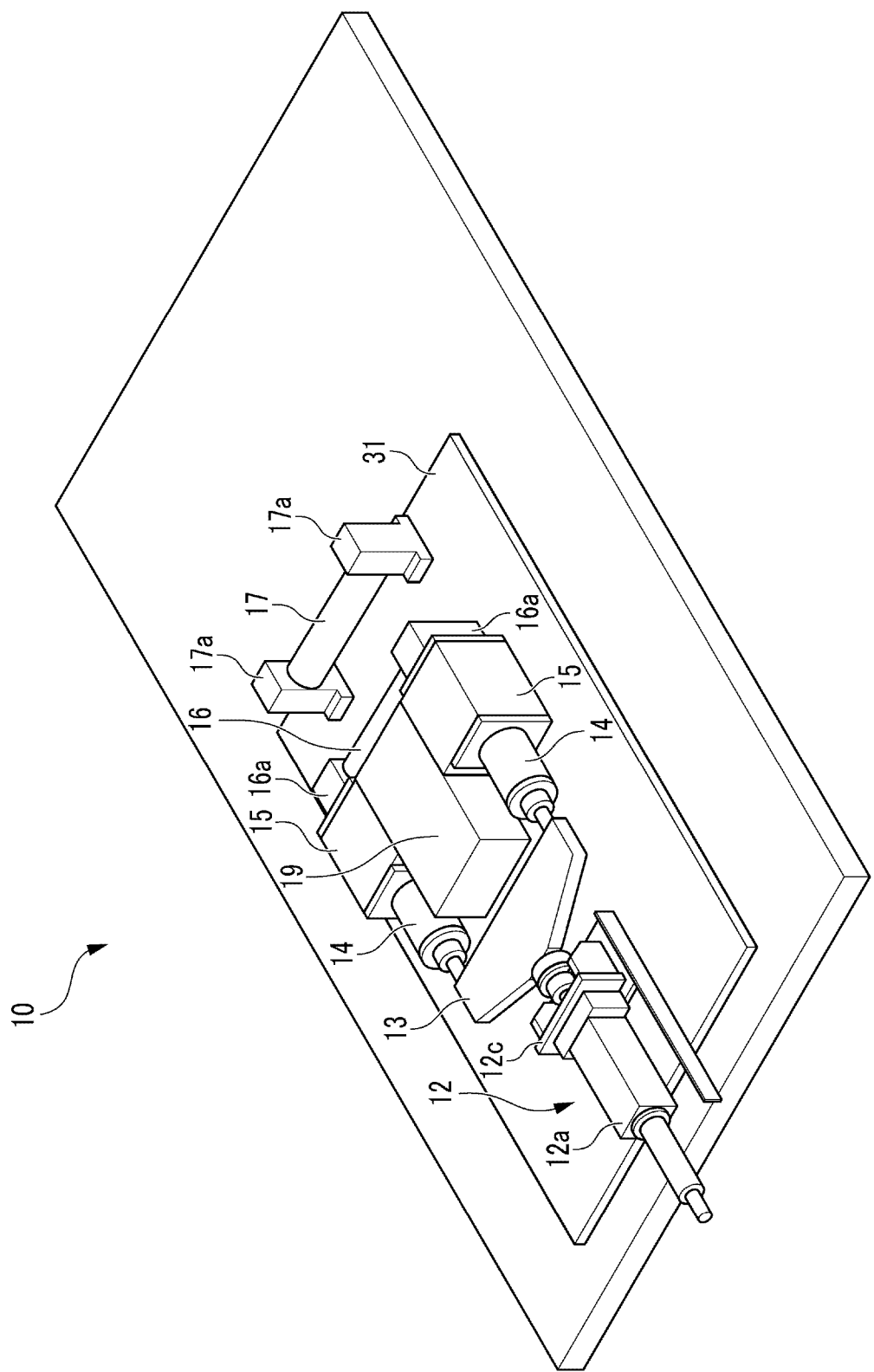
FIG. 6 is a perspective view showing a configuration of the exciter.
Figure 7:
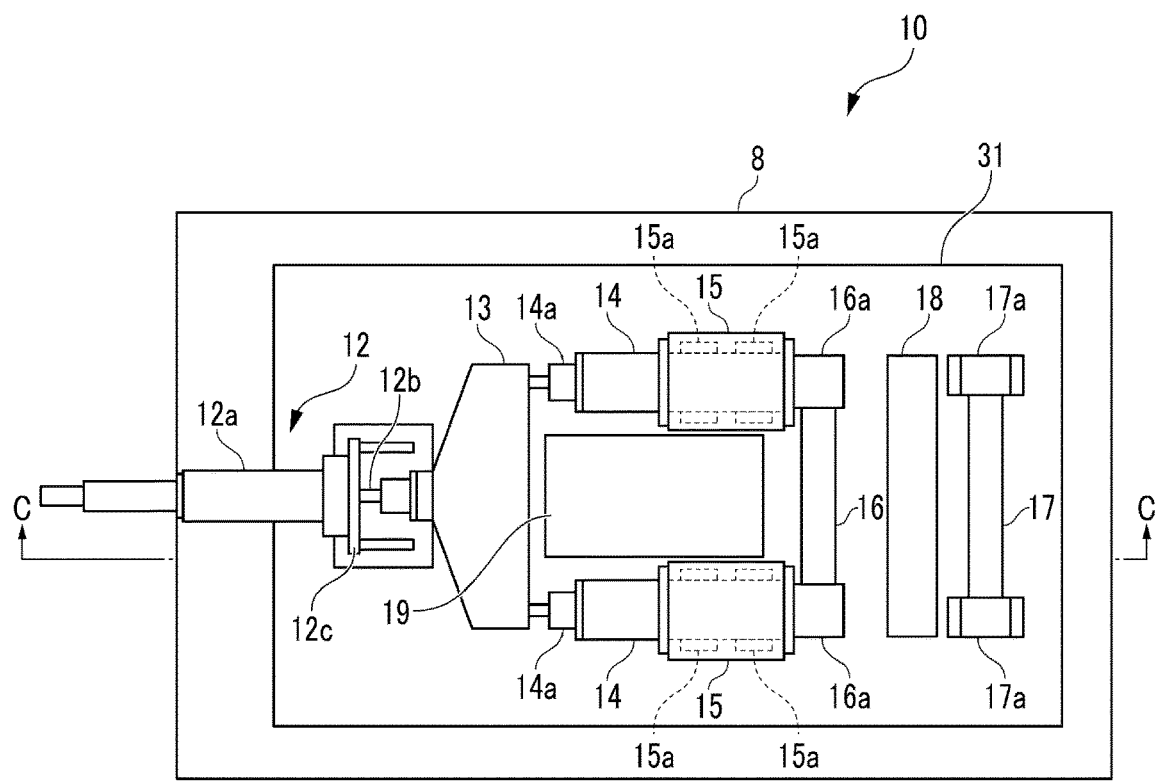
FIG. 7 is a plan view showing a state where a second roller of the exciter is at an excitation position.

Furthermore, a pair of supports 5d are provided on the back surface of the front end of the front mounting plate 5 (see FIG. 5). The supports 5d extend downward from a portion slightly behind the rear end of the long hole 5b in a state of being spaced from each other in the left-right direction.

When the front mounting plate 5 is fixed to the front slope part 3, the lower end of each support 5d is in contact with the upper surface of the base plate 8. Thus, a force acting on the front mounting plate 5 from above is supported by the supports 5d.

The rear end of the front mounting plate 5 is fixed to the rear mounting plate 6 while being pressed against the front end of the rear mounting plate 6 by the hydraulic clamp device 9A.

An opening 5g is provided behind the center of the front mounting plate 5. The opening 5g is formed in a rectangular shape in the plan view and penetrates the front mounting plate 5 in the vertical direction. The exciter 10 is arranged below the opening 5g, and details of the exciter 10 will be described later.

The opening 5g is provided for the lower side of the wheel W of the vehicle V to be held by a first roller 17 and a second roller 16 of the exciter 10 via the opening 5g when the vehicle V is inspected, as will be described later.

Therefore, a width of the opening 5g in the left-right direction is set to be much larger than a width of an installation surface of the wheel W, and a length of the opening 5g in the front-rear direction is set to be much larger than a length of the installation surface of the wheel W in the front-rear direction. Thus, when the lower side of the wheel W is excited in a state of being held by the first roller 17 and the second roller 16, the wheel W does not interfere with an edge of the opening 5g.

Next, the rear mounting plate 6 will be described. The rear mounting plate 6 has a rectangular shape that is horizontally long in the plan view and extends in the front-rear direction, and four ribs 6a are provided on a surface of the rear mounting plate 6. Each of the four ribs 6a has the same function as each of the four ribs 5a described above, and the center line extending in the front-rear direction is arranged on the same straight line as the center line of each of the four ribs 5a described above.

Similar to the ribs 5a, the ribs 6a also define a traveling path and have a function of guiding the wheels W of the vehicle V. Thus, at the time of inspection, the wheels W are guided by the rear mounting plate 6 as the vehicle V rides on the mounting table 2 and moves to the inspection position. In the mounting table 2, the upper ends of the ribs 5a and 6a are set at the same height and are the highest portions of the mounting table 2.

The upper surface of the rear end of the rear mounting plate 6 is arranged at the same height as the upper surface of the front end of the front mounting plate 5 described above, and the rear end of the rear mounting plate 6 is configured to be plane-symmetric with the front end of the front mounting plate 5. That is, the rear end of the rear mounting plate 6 is mounted on the flat part 3a of the rear slope part 3, and a pair of long holes 6b are formed between the two ribs 6a at the left and right ends.

The piston rod 9c of the hydraulic clamp device 9 is fitted into each long hole 6b, and the piston rod 9c is also fitted into the long hole 3c of the rear slope part 3.

The rear end of the front mounting plate 5 is mounted on the upper surface of the front end of the rear mounting plate 6, and a pair of long holes 6e are formed at the left and right ends. Each of the long holes 6e has the same length in the front-rear direction as each of the long holes 6b, and is arranged concentrically with each long hole 6b in the front-rear direction. As described above, the piston rod of the hydraulic clamp device 9A is fitted into each long hole 6e.

With the above configuration, in a state where the fixing of the hydraulic clamp devices 9 and 9A is released, an edge of the long hole 6b of the rear mounting plate 6 can move along the piston rod 9c of the hydraulic clamp device 9, and an edge of the long hole 6e of the rear mounting plate 6 can move along the piston rod of the hydraulic clamp device 9A.

Thus, the rear mounting plate 6 can move in the front-rear direction relative to the rear slope part 3 by the lengths of the long holes 6b and 6e in the front-rear direction. Specifically, the rear mounting plate 6 is configured to be movable in the front-rear direction between a maximum length position shown in FIG. 2 and a minimum length position shown in FIG. 3.

Further, in a state where the fixing of the hydraulic clamp device 9 is released, the rear mounting plate 6 can move in the left-right direction by the length of the long hole 3c while the piston rod 9c is guided by the long hole 3c of the rear slope part 3. Thus, the rear mounting plate 6 is configured to be movable in the left-right direction between a maximum width position shown in FIG. 2 and a minimum width position shown in FIG. 3 in a state of being integrated with the front mounting plate 5.

Furthermore, a pair of supports 6d are provided on the back surface of the rear end of the rear mounting plate 6. The supports 6d extend downward from a portion slightly behind the rear end of the long hole 6b in a state of being spaced from each other in the left-right direction.

When the rear mounting plate 6 is fixed to the rear slope part 3, the lower ends of the supports 6d are in contact with the upper surface of the base plate 8. Thus, a force acting on the rear mounting plate 6 from above is supported by the supports 6d.

In addition, three supports 6h are provided on the back surface of the front end of the rear mounting plate 6. The three supports 6h extend downward from a portion between the two long holes 6e of the rear mounting plate 6 in a state of being spaced from each other in the left-right direction.

When the rear end of the rear mounting plate 6 is fixed to the rear slope part 3 by the hydraulic clamp device 9, and the front end of the rear mounting plate 6 is fixed to the front mounting plate 5 via the hydraulic clamp device 9A, the lower end of each of the supports 6h is in contact with the upper surface of the base plate 8. Thus, a force acting on the rear mounting plate 6 from above is supported by the supports 6h.

Further, an opening 6g is provided at the center of the rear mounting plate 6. The opening 6g is formed in a rectangular shape in the plan view and penetrates the rear mounting plate 6 in the vertical direction, and is configured to have the same size as the above-described opening 5g of the front mounting plate 5. The exciter 10 is arranged below the opening 6g.

Next, the exciter 10 will be described with reference to FIG. 5 to FIG. 10. FIG. 5 shows a configuration in which the top plate 7 is omitted for easy understanding. In the vehicle inspection device 1 of the present embodiment, the exciter 10 arranged below the opening 5g of the front mounting plate 5 and the exciter 10 arranged below the opening 6g of the rear mounting plate 6 have the same configuration. Therefore, the exciter 10 arranged below the opening 5g of the front mounting plate 5 will be described as an example hereinafter.

The exciter 10 is provided on a movable base plate 31 of the position changing device 30, and the planar position of the exciter 10 is changed by the position changing device 30. The configuration of the position changing device 30 will be described later. In the present embodiment, the exciter 10 corresponds to an operation machine, and the movable base plate 31 corresponds to a moving member.

As shown in FIG. 6 to FIG. 10, the exciter 10 includes a hydraulic actuator 12, an excitation arm 13, two excitation shafts 14, two bearing parts 15, the second roller 16, the first roller 17, a ground base 18, a passage base 19, etc.

Figure 8:
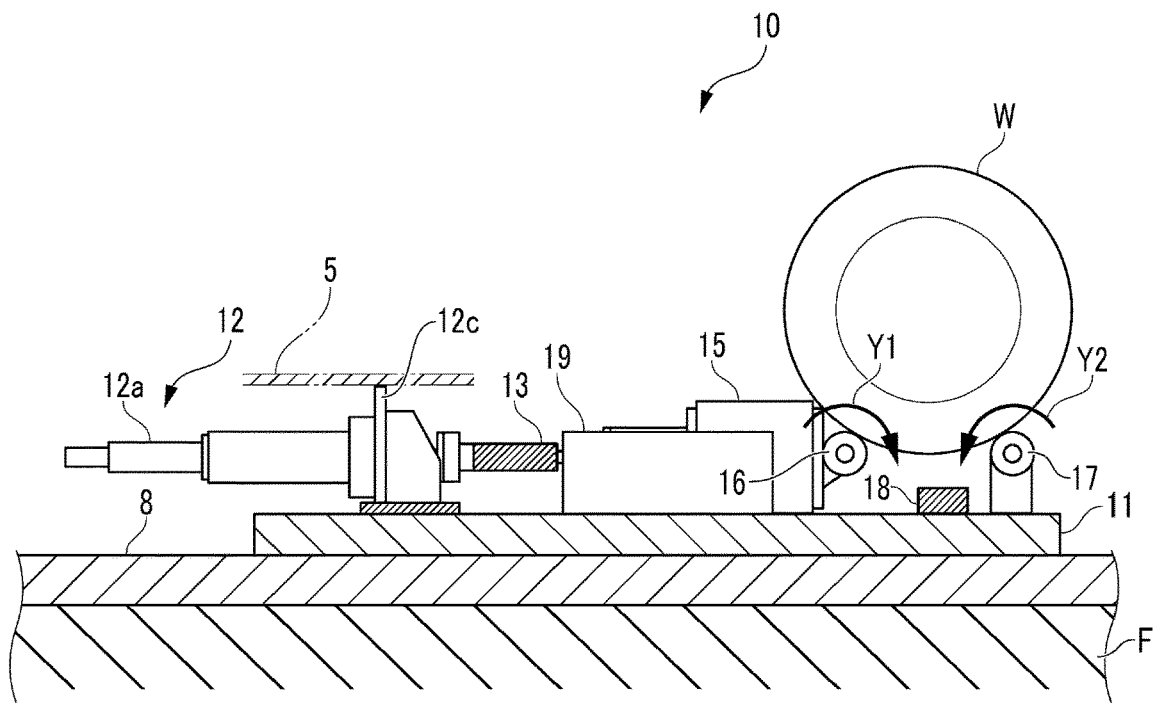
FIG. 8 is a side view showing a cross section taken along the line C-C of FIG. 7.
Figure 9:
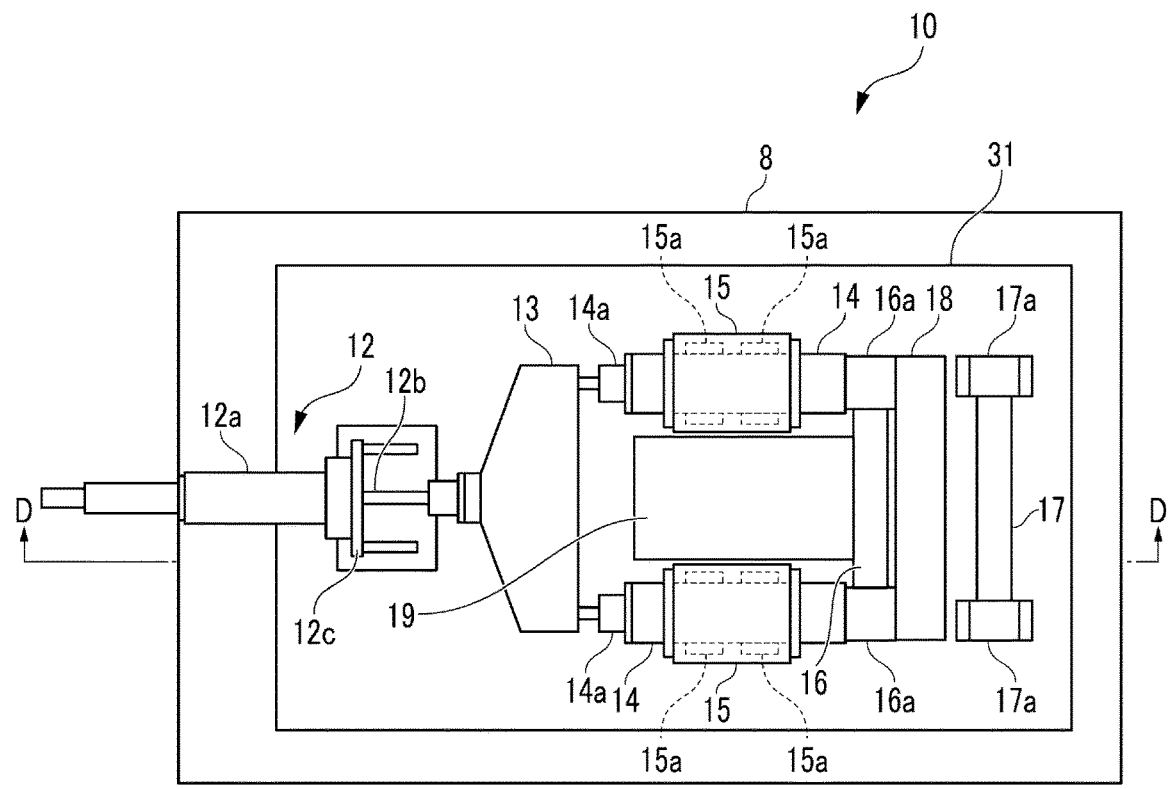
FIG. 9 is a plan view showing a state where the second roller of the exciter is at a push-out position.
Figure 10:
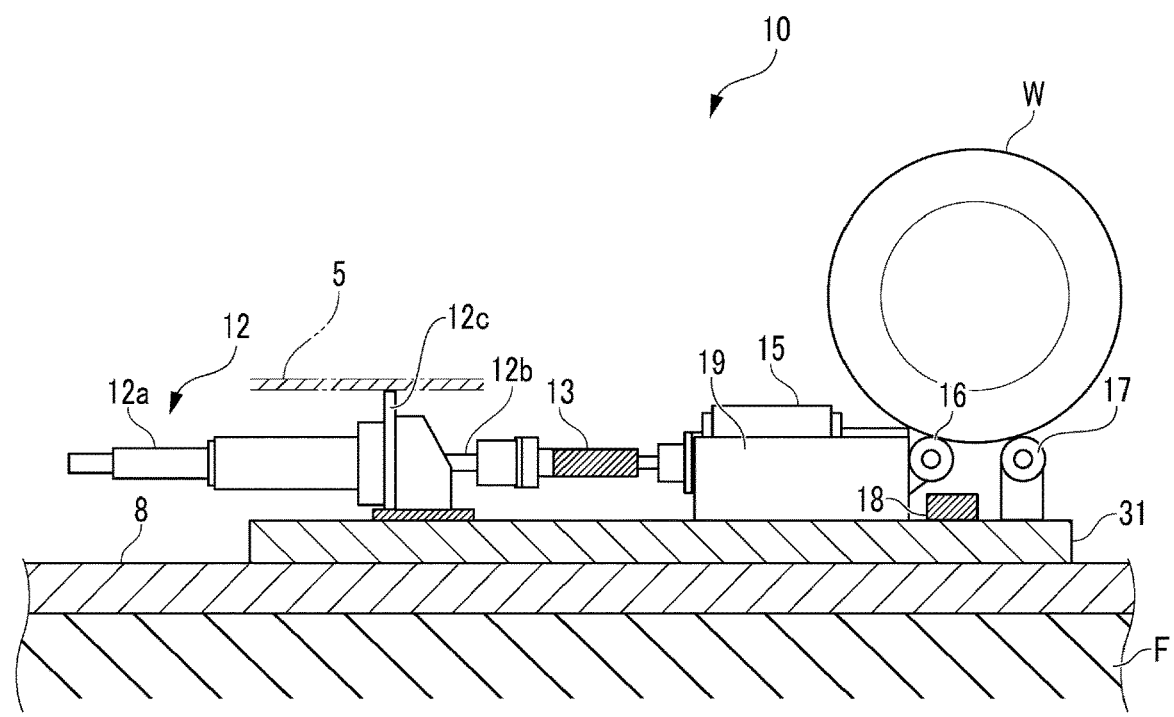
FIG. 10 is a side view showing a cross section taken along the line D-D of FIG. 9.

In FIG. 8 and FIG. 10, hatching of the cross sections of the second roller 16 and the first roller 17 is omitted for easy understanding.

The hydraulic actuator 12 includes a hydraulic cylinder 12a, a piston rod 12b, a bracket 12c, etc. The bracket 12c is provided for supporting the hydraulic cylinder 12a, and the lower end of the bracket 12c is bolted to the movable base plate 11. Further, the bracket 12c is bolted to the front mounting plate 5 in a state where the upper end of the bracket 12c is in contact with the lower surface of the front mounting plate 5. The hydraulic cylinder 12a is connected to the hydraulic circuit (not shown), and supplied with the hydraulic pressure from the hydraulic circuit.

The excitation arm 13 is connected to the tip of the piston rod 12b of the hydraulic actuator 12. In the hydraulic actuator 12, the hydraulic pressure supplied from the hydraulic circuit to the hydraulic cylinder 12a is controlled by the control device described above, by which the piston rod 12b is driven. Accordingly, the piston rod 12b is configured to drive the excitation arm 13 in the front-rear direction or to excite.

The left and right ends of the excitation arm 13 are respectively connected to the front ends of the excitation shafts 14 via ball joints 14a. The excitation shafts 14 are arranged at an interval in the left-right direction and extend in the front-rear direction in parallel to each other, and are slidably supported in the front-rear direction by the bearing parts 15.

In each bearing part 15, two hydrostatic bearings 15a are arranged side by side at a predetermined interval in the front-rear direction. The excitation shaft 14 is supported by the hydrostatic bearings 15a so that when the excitation shaft 14 vibrates in the front-rear direction, the vibration in a direction orthogonal to the front-rear direction (for example, left-right front-rear direction) is suppressed.

As shown in FIG. 5, an edge on the front side of the opening 5g of the front mounting plate 5 is an attachment part 5c. The attachment part 5c extends at a predetermined length in the front-rear direction, and the left and right ends of the attachment part 5c are respectively fixed to the upper surfaces of the bearing parts 15 via screws (not shown). Further, the edges 5h of the opening 5g located in the left-right direction of the attachment part 5c of the front mounting plate 5 are also respectively fixed to the upper surfaces of the bearing parts 15 via screws (not shown).

Further, the portions 5h located in the left-right direction of the attachment parts 5c of the front mounting plate 5 are also respectively fixed to the upper surfaces of the bearing parts 15 via screws (not shown). As described above, the upper surfaces of the bearing parts 15 are fixed to the front mounting plate 5 and the lower surfaces of the bearing parts 15 are fixed to the movable base plate 31.

In addition, bearings 16a are respectively provided at the rear ends of the excitation shafts 14. The second roller 16 extends in the left-right direction at a position at a predetermined height from the upper surface of the movable base plate 31, and two ends of the second roller 16 are respectively supported by the bearings 16a. One-way clutches (not shown) are built in the bearings 16a, by which the second roller 16 is configured to be rotatable around the center axis line only in the clockwise direction (the direction of the arrow Y1) in FIG. 8.

With the above configuration, the second roller 16 is at least driven between an excitation position (for example, the position shown in FIG. 7 and FIG. 8) and a push-out position (for example, the position shown in FIG. 9 and FIG. 10) by the hydraulic actuator 12. Further, the vibration in the front-rear direction generated by the hydraulic actuator 12 is input to the second roller 16 via the excitation arm 13 and the excitation shafts 14.

Behind the second roller 16, the first roller 17 is provided to face and in parallel to the second roller 16. The left and right ends of the first roller 17 are supported by a pair of bearings 17a, and the bearings 17a are fixed onto the movable base plate 11. One-way clutches (not shown) are built in the bearings 17a, by which the first roller 17 is configured to be rotatable around the center axis line only in the counterclockwise direction (the direction of the arrow Y2) in FIG. 8. The first roller 17 is arranged so that the upper end of the first roller 17 is at a position slightly higher than the upper end of the second roller 16. Nevertheless, the first roller 17 may be arranged so that the upper end of the first roller 17 is at the same position as the upper end of the second roller 16.

When the vehicle V is inspected, since the lower side of the wheel W of the vehicle V is held by the first roller 17 and the second roller 16 described above, the size of the first roller 17 and the second roller 16 in the left-right direction is set to a value sufficiently larger than the width of the wheel W.

Further, the above-described ground base 18 is fixed between the first roller 17 and the second roller 16 on the movable base plate 31. The ground base 18 has a rectangular parallelepiped shape that is long in the left-right direction and is arranged in parallel to the first roller 17 and the second roller 16, and two ends of the ground base 18 extend to the same positions as the end surfaces of the pair of bearings 17a.

In the case of the ground base 18, the interval between the upper surface of the ground base 18 and the upper end surface of the rib 5a of the front mounting plate 5 is set to a value smaller than the minimum ground clearance of the vehicle V. This is to prevent the minimum ground clearance portion on the bottom surface of the vehicle V from coming into contact with the upper end surface of the rib 5a of the mounting plate 5 if the interval between the first roller 17 and the second roller 16 is increased for some reason and causes the wheel W to move downward during excitation, etc.

In addition, the above-described passage base 19 is arranged between the bearing parts 15 on the movable base plate 31. The passage base 19 has a rectangular parallelepiped shape that is long in the front-rear direction, and a hydraulic actuator (not shown) is built in the passage base 19. The passage base 19 is driven in the front-rear position at least between a retracted position (for example, the position shown in FIG. 7 and FIG. 8) and a contact position (for example, the position shown in FIG. 9 and FIG. 10) where the passage base 19 contacts the second roller 16 at the push-out position by the hydraulic actuator.

When the passage base 19 moves to the contact position and comes into contact with the second roller 16 at the push-out position, the second roller 16 is held by the passage base 19 to be nonrotatable. This is to hold the second roller 16 in a rotation stopped state so as to transmit the driving force of the wheel W to the second roller 16 and facilitate moving the wheel W forward when the wheel W of the vehicle V moves forward while riding over the second roller 16 after the excitation operation is completed.

Furthermore, the upper surface of the passage base 19 functions as a passage for the wheel W when the wheel W moves forward as described above. Therefore, the height of the upper surface of the passage base 19 is set to the same height as the upper surface of the second roller 16.

Next, the position changing device 30 of the present embodiment will be described. The position changing device 30 changes the position of the exciter 10 of the front mounting plate 5 described above in a plane within a predetermined range between a maximum inspection position shown in FIG. 11 and a minimum inspection position shown in FIG. 12. That is, the position of the exciter 10 in the front-rear direction is changed by the position changing device 30 by the distance between the maximum inspection position and the minimum inspection position, and the position of the exciter 10 in the left-right direction is changed by the position changing device 30 by the distance between the maximum inspection position and the minimum inspection position.

The maximum inspection position is a position of the exciter 10 when a vehicle V having the largest tread and wheelbase is inspected, and corresponds to a position of the exciter 10 when the front mounting plate 5 is at the maximum length position and the maximum width position described above.

In addition, the minimum inspection position is a position of the exciter 10 when a vehicle V having the smallest tread and wheelbase is inspected, and corresponds to a position of the exciter 10 when the front mounting plate 5 is at the minimum length position and the minimum width position described above.

The position changing device 30 includes the base plate 8, the movable base plate 31, three magnet clamps 32, four pulley mechanisms 40, etc. A plurality of free bearings (not shown) are provided on the upper surface of the base plate 8. The movable base plate 31 is formed in a rectangular shape in the plan view, and is made of a metal plate of a magnetic substance.

The three magnet clamps 32 (magnet mechanisms) are a combination of solenoids and permanent magnets, and are arranged at three predetermined positions on the base plate 8. These magnet clamps 32 generate a magnetic flux by flowing a current through the solenoid during a fixing operation, and the magnetic flux attracts the movable base plate 31 to the side of the base plate 8 and fixes the movable base plate 31 to the base plate 8.

Further, at the time of releasing the fixing, the magnet clamps 32 demagnetize the magnetic flux by flowing a current through the solenoid, and thereby release the fixing of the movable base plate 31 to the base plate 8.

Figure 11:
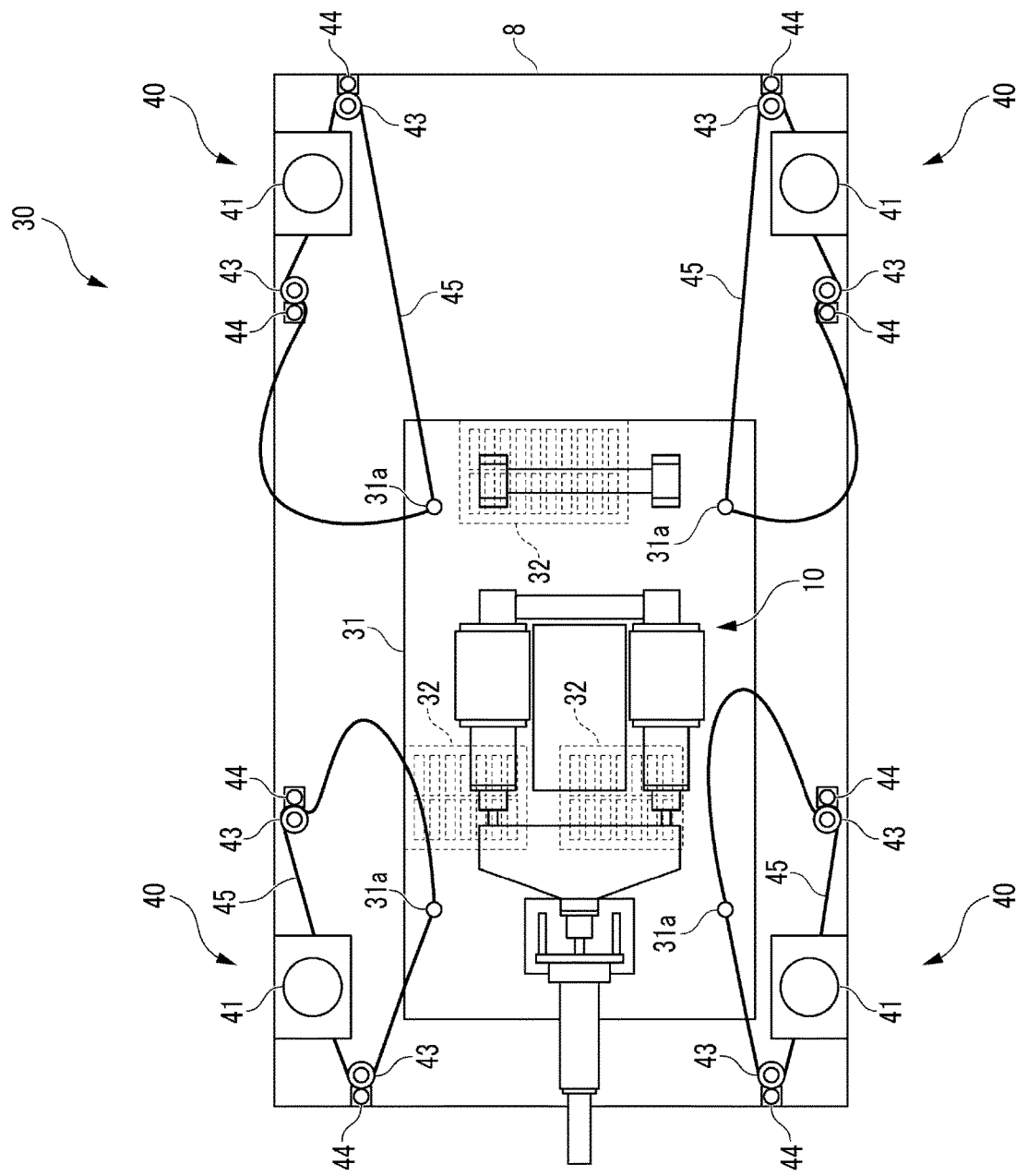
FIG. 11 is a plan view showing the position changing device when the exciter is at a maximum inspection position.
Figure 12:
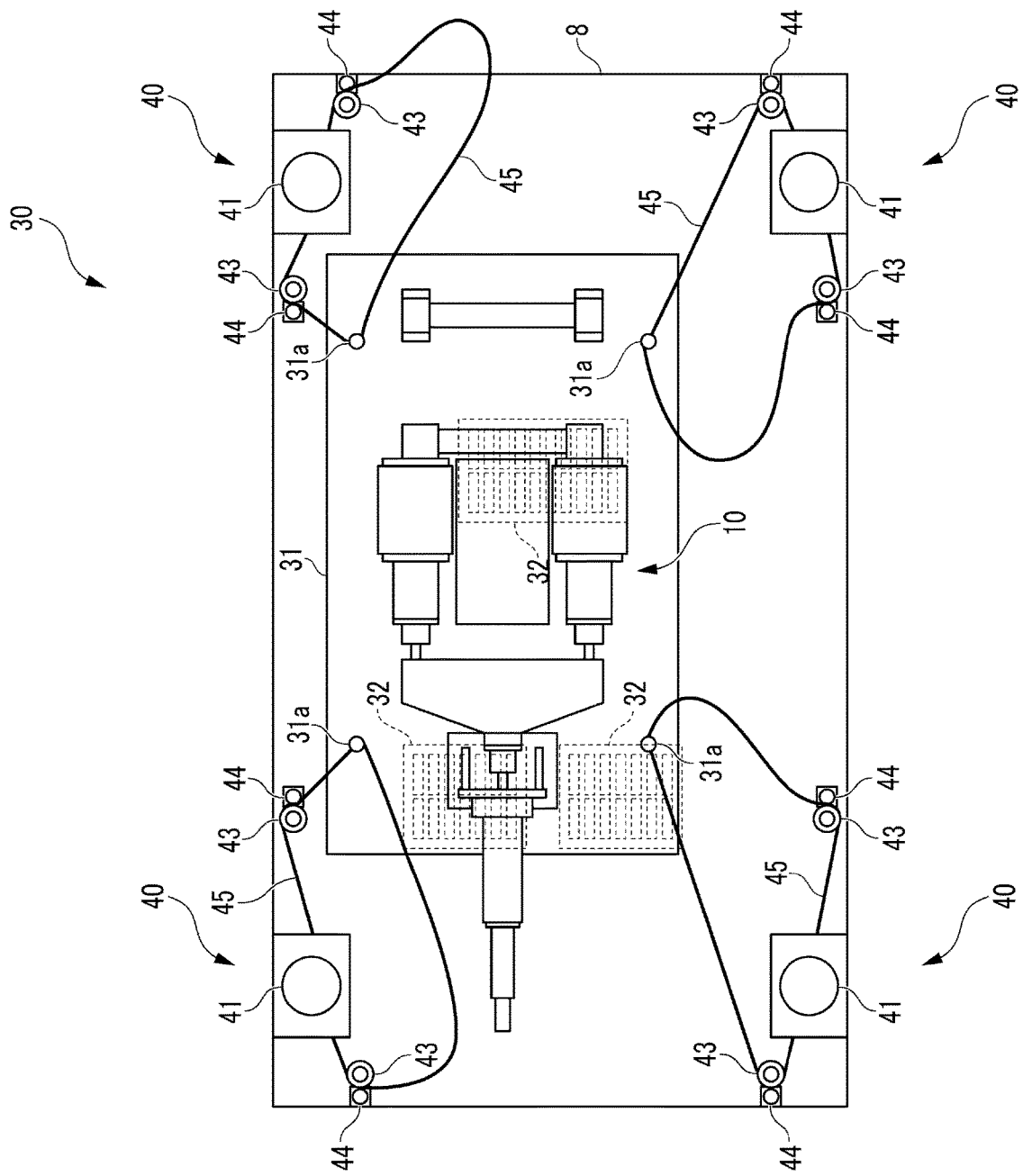
FIG. 12 is a plan view showing the position changing device when the exciter is at a minimum inspection position.

As shown in FIG. 11 and FIG. 12, the three magnet clamps 32 are arranged to overlap the movable base plate 31 in the plane regardless of whether the movable base plate 31 is at the maximum inspection position or the minimum inspection position. Thus, the movable base plate 31 is fixed to the base plate 8 by the magnet clamps 32 at the maximum inspection position and the minimum inspection position, and is also fixed to the base plate 8 at a position between the maximum inspection position and the minimum inspection position.

Figure 13:
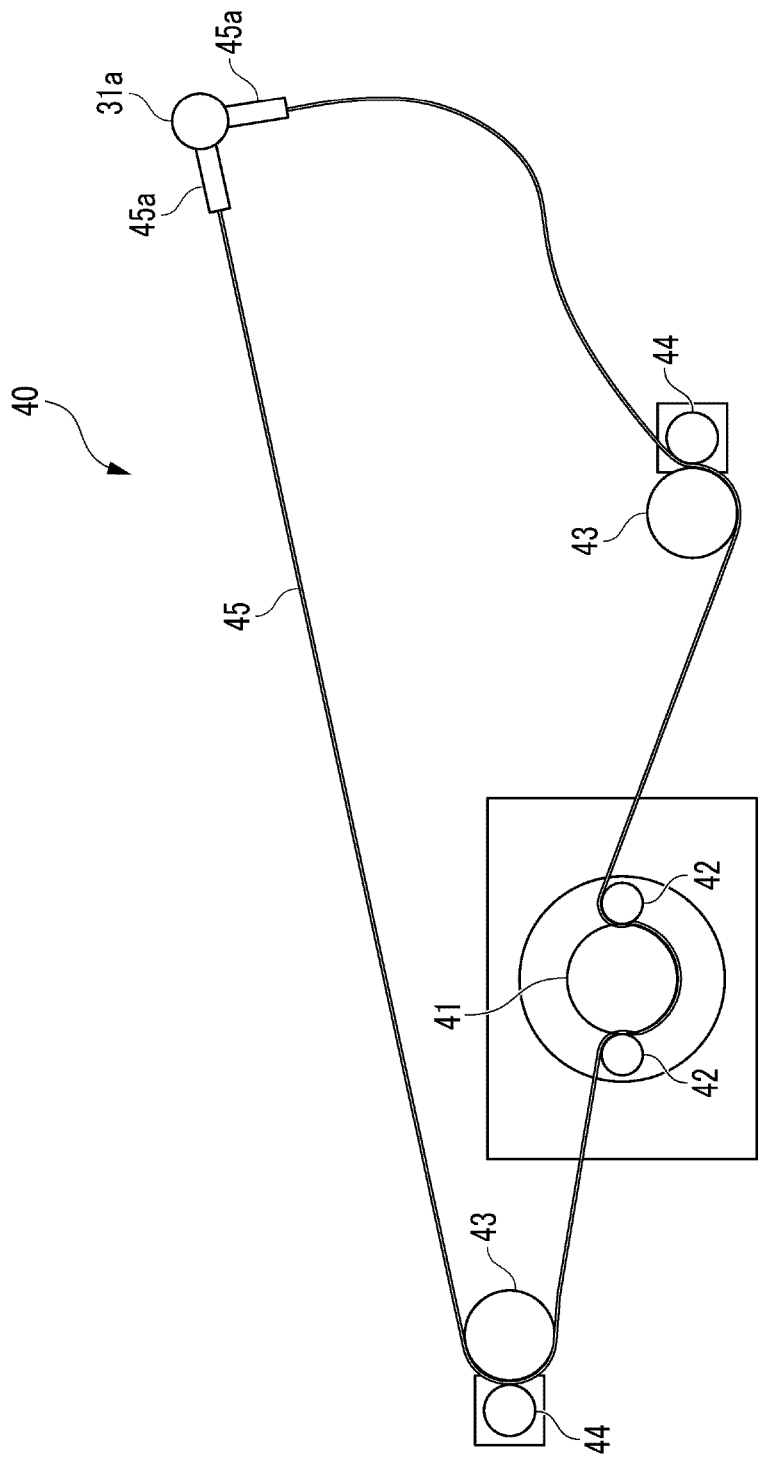
FIG. 13 is a plan view schematically showing a configuration of the position changing device.

The four pulley mechanisms 40 (moving mechanisms) are arranged on the base plate 8 in a positional relationship of a quadrangular shape in the plan view around the movable base plate 31 so as to surround the movable base plate 31. As shown in FIG. 13, each pulley mechanism 40 includes a driving pulley 41, two idler rollers 42, two driven pulleys 43, two idler rollers 44, a toothed belt 45, etc.

FIG. 13 shows a configuration in which the pulley mechanism 40 located on the left front side of FIG. 12 is enlarged and a part of the pulley mechanism 40 is broken, and the hatching of the cross section is omitted for easy understanding.

Figure 14:
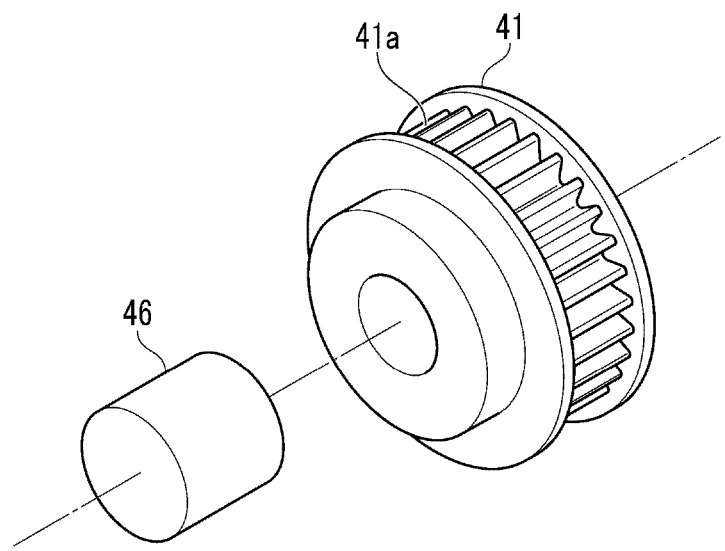
FIG. 14 is a perspective view showing a driving pulley and a driving mechanism.
Figure 15:
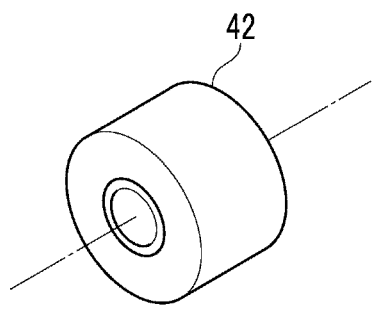
FIG. 15 is a perspective view showing an idler pulley.
Figure 16:
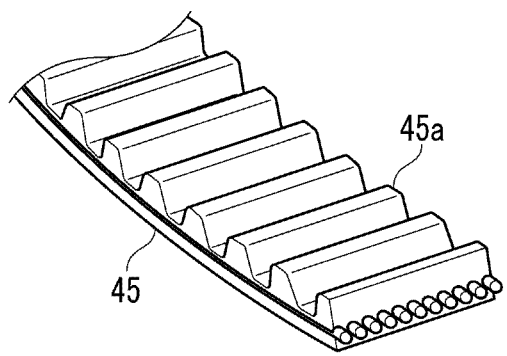
FIG. 16 is a perspective view showing a part of a toothed belt.

As shown in FIG. 14, the driving pulley 41 is of a toothed pulley type, and teeth 41a are provided on the outer peripheral surface of the driving pulley 41 at equal intervals along a circumferential direction. Further, the toothed belt 45 has flexibility, and teeth 45a (see FIG. 16) are provided on the inner peripheral surface of the toothed belt 45 at equal intervals along the circumferential direction. The toothed belt 45 is wound around the left half of the outer periphery of the driving pulley 41 in a state where the teeth 45a mesh with the teeth 41a of the driving pulley 41.

In addition, a driving mechanism 46 is connected to the driving pulley 41. The driving mechanism 46 is a combination of an electric motor and a gear mechanism. The driving pulley 41 is driven by the driving mechanism 46 to rotate forward and backward around an axis line that extends in the vertical direction.

Furthermore, the idler rollers 42 described above are arranged close to the driving pulley 41 in the front-rear direction, and each idler roller 42 is provided to be rotatable forward and backward around the axis line that extends in the vertical direction. The idler rollers 42 hold the toothed belt 45 between the idler rollers 42 and the driving pulley 41 while pressing the toothed belt 45 toward the side of the driving pulley 41.

With the above configuration, during the rotation of the driving pulley 41, the toothed belt 45 is driven by the driving pulley 41 with no looseness between the toothed belt 45 and the driving pulley 41, and the toothed belt 45 is held between the driving pulley 41 and the idler rollers 42 in a state where the toothed belt 45 does not come off. In the present embodiment, the driving pulley 41 corresponds to a first rotating member and a toothed pulley, the idler roller 42 corresponds to a second rotating member and a roller, and the toothed belt 45 corresponds to an elongated member.

Figure 17:
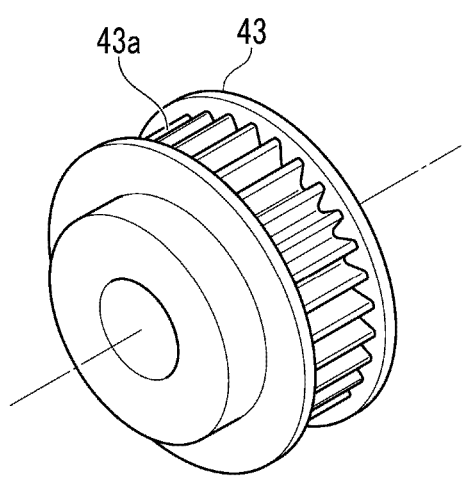
FIG. 17 is a perspective view showing a driven pulley.

The two driven pulleys 43 described above are arranged at predetermined positions in the front-rear direction of the driving pulley 41. As shown in FIG. 17, each driven pulley 43 is of a toothed pulley type similar to the driving pulley 41, and the toothed belt 45 is wound around the outer periphery of the driven pulley 43 in a state where the teeth 45a mesh with the teeth 43a of the driven pulley 43.

Further, regarding the two idler rollers 44, the front idler roller 44 is arranged close to the front of the front driven pulley 43, and the rear idler roller 44 is arranged close to the rear of the rear driven pulley 43. Each idler roller 44 is provided to be rotatable forward and backward around an axis line that extends in the vertical direction, and holds the toothed belt 45 between the idler roller 44 and the driven pulley 43 while pressing the toothed belt 45 toward the side of the driven pulley 43.

With the above configuration, during the rotation of the driving pulley 41, the driven pulley 43 guides the toothed belt 45 with no looseness between the toothed belt 45 and the driven pulley 43. At this time, the toothed belt 45 is held between the driven pulley 43 and the idler roller 44 in a state where the toothed belt 45 does not come off. In the present embodiment, the driven pulley 43 corresponds to the first rotating member and the toothed pulley, and the idler roller 44 corresponds to the second rotating member and the roller.

On the upper surface of the movable base plate 31, four connecting pins 31a are arranged in a positional relationship of a quadrangular shape in the plan view. Connecting members 45a at two ends of the toothed belt 45 are connected to one connecting pin 31a so as to be rotatable around an axis line thereof but not come off.

With the above configuration, in the position changing device 30, when the movable base plate 31 is released from being fixed to the base plate 8 by the magnet clamps 32 described above, the movable base plate 31 moves on the base plate 8 between the maximum inspection position shown in FIG. 11 and the minimum inspection position shown in FIG. 12 while rolling a plurality of free bearings with the rotation of the driving pulleys 41 in the four pulley mechanisms 40.

At this time, in the right front pulley mechanism 40, the portion of the toothed belt 45 between the rear driven pulley 43 and the connecting pin 31a is in a loosened state when the movable base plate 31 is at the maximum inspection position in FIG. 11. Further, the portion of the toothed belt 45 between the front driven pulley 43 and the connecting pin 31a is in a loosened state when the movable base plate 31 is at the minimum inspection position in FIG. 12.

In the right rear pulley mechanism 40, the portion of the toothed belt 45 between the front driven pulley 43 and the connecting pin 31a is in a loosened state when the movable base plate 31 is at the maximum inspection position in FIG. 11. Further, the portion of the toothed belt 45 between the rear driven pulley 43 and the connecting pin 31a is in a loosened state when the movable base plate 31 is at the minimum inspection position in FIG. 12. As described above, the reason why the toothed belt 45 is partially loosened is that the toothed belt 45 has such a length that can sufficiently secure the moving distance of the movable base plate 31.

The left half of the mounting table 2 is configured as described above, and the right half of the mounting table 2 is configured similarly.

Next, an operation in the vehicle inspection device 1 configured as described above when the vehicle V is inspected will be described. First, the hydraulic clamp devices 9 and 9A are loosened so that the two front mounting plates 5 and the two rear mounting plates 6 are set to be movable in the front-rear direction and the left-right direction. Besides, the four movable base plates 31 are released from being fixed to the base plate 8 by the magnet clamps 32, and the four movable base plates 31 are set to be movable relative to the base plate 8.

In this state, after the four movable base plates 31 are respectively moved to the positions corresponding to the wheelbase and tread of the vehicle V to be inspected by the four position changing devices 30, the four movable base plates 31 are fixed to the base plate 8 by the magnet clamps 32. With the movement of the movable base plates 31, the two front mounting plates 5 and the two rear mounting plates 6 move to the positions corresponding to the wheelbase and tread simultaneously with the movable base plates 31. Then, at these positions, at the same time as the front mounting plate 5 and the rear mounting plate 6 are fixed to each other via the hydraulic clamp device 9A, the front mounting plate 5 and the rear mounting plate 6 are fixed to the front and rear slope parts 3 via the hydraulic clamp devices 9.

Next, the hydraulic actuator 12 in each exciter 10 is driven, and the interval between the first roller 17 and the second roller 16 is set to a value corresponding to the size of the wheel W of the vehicle V to be inspected. Thereby, the preparation operation for the inspection is completed.

Figure 18:
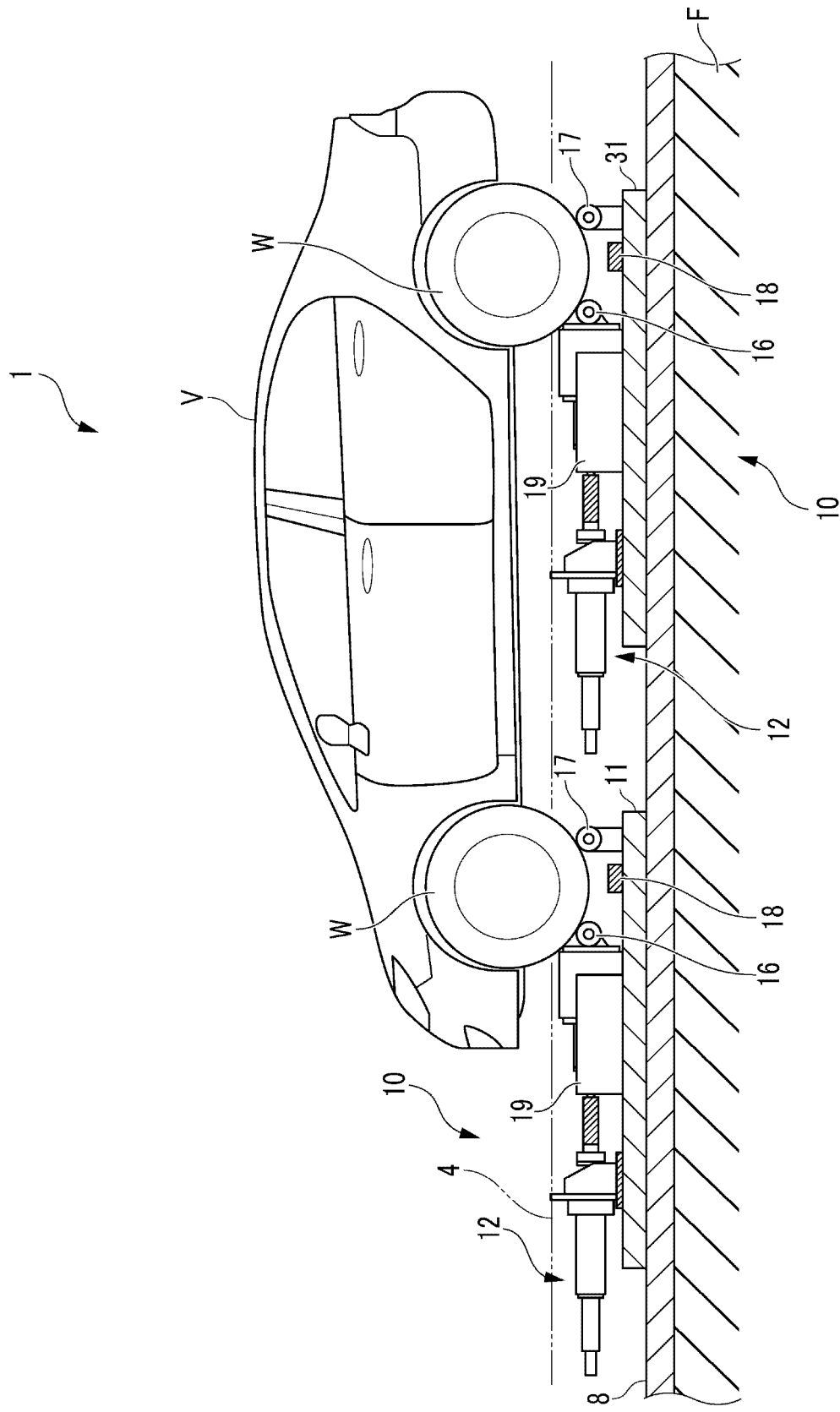
FIG. 18 is a view showing a state where a vehicle is mounted so as to be excited in the vehicle inspection device.

Next, the vehicle V is moved to ride on the mounting table 2 from the rear slope part 3, and as shown in FIG. 18, the four wheels W fit into the openings 5g of the front mounting plates 5 and the openings 6g of the rear mounting plates 6 and move downward, and enter a state of being held by the first rollers 17 and the second rollers 16 from the front-rear direction.

Figure 19:
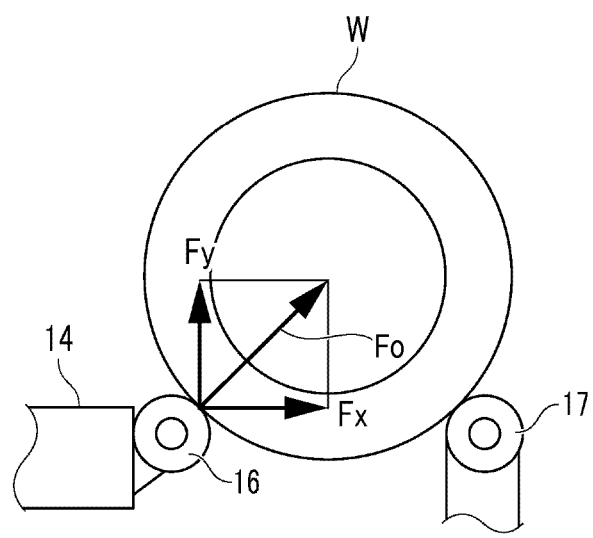
FIG. 19 is an explanatory view showing a pressing force acting on a wheel during excitation and force components thereof.

In this state, the hydraulic actuator 12 excites the second roller 16 in the front-rear direction so as to excite the wheel W. During the excitation, when a pressing force Fo of the second roller 16 acts on the wheel W, two force components Fx and Fy of the pressing force Fo act on the wheel W as shown in FIG. 19. That is, by exciting the second roller 16 in the front-rear direction, the wheel W is excited in the front-rear direction and the vertical direction simultaneously.

Figure 20:
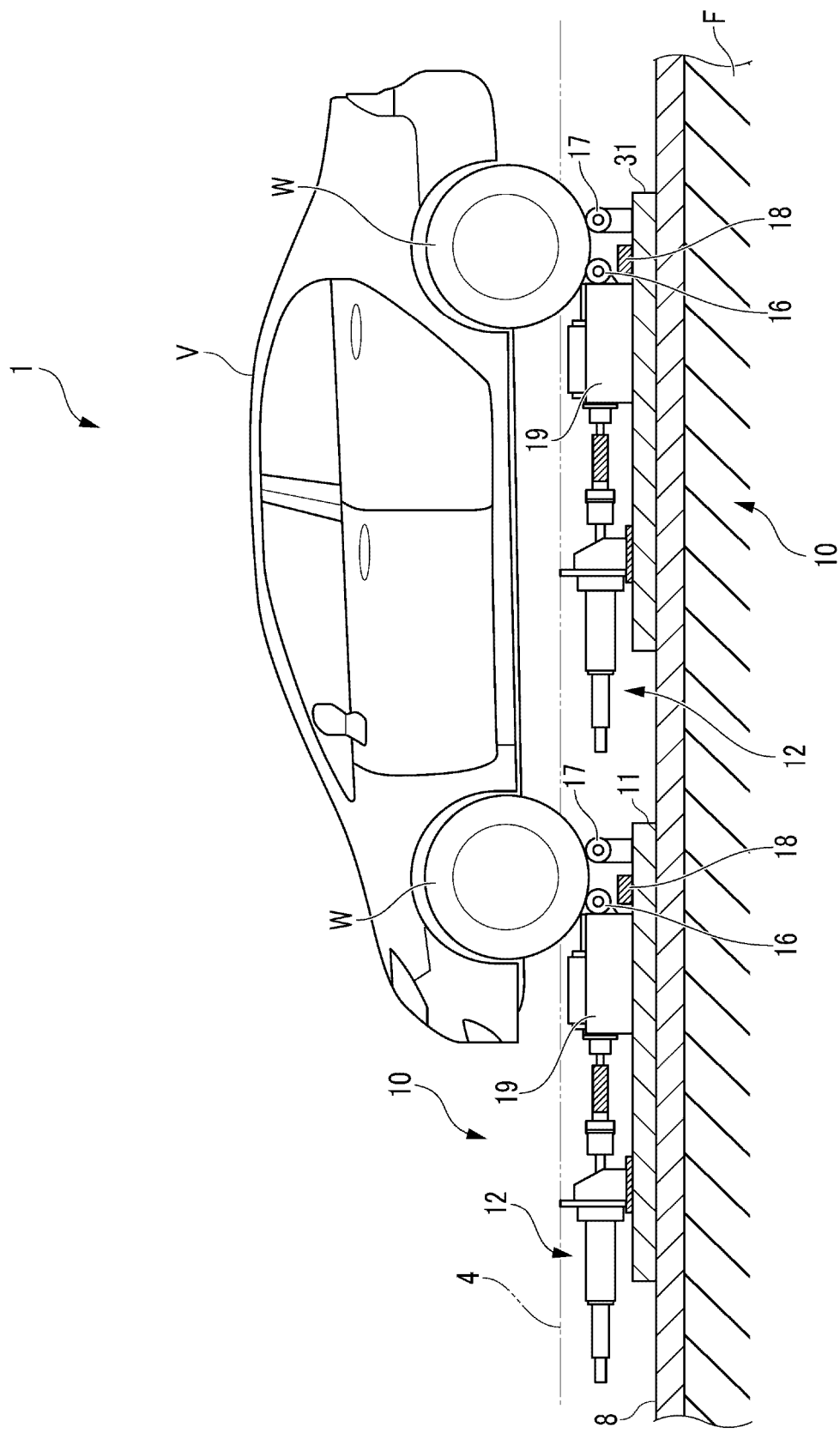
FIG. 20 is a view showing a state immediately before the vehicle gets out of the exciters.

When the excitation operation is performed as described above for a predetermined time and the inspection of the vehicle V is completed, the second roller 16 is moved from the inspection position shown in FIG. 18 to the push-out position shown in FIG. 20 by the hydraulic actuator 12. At the same time, the passage base 19 is moved from the retracted position shown in FIG. 7 and FIG. 8 to the contact position shown in FIG. 9 and FIG. 10 by the hydraulic actuator. Thus, the rear end of the passage base 19 comes into contact with the second roller 16 at the push-out position, so that the second roller 16 is held in the rotation stopped state.

In this state, the vehicle V starts moving forward, by which the wheel W can easily get out of the space between the two rollers 16 and 17 while riding over the second roller 16 in the rotation stopped state. Thus, the vehicle V can move forward and get off the mounting table 2 via the front slope parts 3.

As described above, according to the position changing device 30 of the present embodiment, the four pulley mechanisms 40 are provided so as to surround the movable base plate 31. In each pulley mechanism 40, two ends 45a of the toothed belt 45 are connected to the movable base plate 31, and the portions (connecting pins 31a) connected with the movable base plate 31 are arranged in a positional relationship of a quadrangular shape in the plan view. Then, the four driving pulleys 41 are rotationally driven around the axis line by the four driving mechanisms 46, so that the movable base plate 31 is driven via the four toothed belts 45 so as to move within the predetermined range between the maximum inspection position shown in FIG. 11 and the minimum inspection position shown in FIG. 12.

In this case, in each pulley mechanism 40, the connecting pin 31a, the driving pulley 41, and the two driven pulleys 43 are located at the vertices of a quadrangular shape in the plan view, and the movable base plate 31 is driven by changing the distances between the connecting pin 31a and the two driven pulleys 43. Accordingly, compared with a case where three cylinders extend linearly as in Patent Document 1, the planar space of the configuration required for the position change can be reduced, and the size of the entire device in the plane can be reduced.

In addition, the toothed belt 45 is wound around the driving pulley 41, which is a toothed pulley, and is held between the driving pulley 41 and the two idler rollers 42, and is wound around the two driven pulleys 43, which are toothed pulleys, and is held between each driven pulley 43 and the idler roller 44. Thus, when the driving pulley 41 is rotationally driven by the driving mechanism 46, looseness and slippage of the toothed belt 45 wound around the driving pulley 41 and the driven pulleys 43 are suppressed. As a result, the movable base plate 31 can be reliably moved.

Furthermore, since the movable base plate 31 made of a magnetic substance is configured to be detachable from the base plate 8 within the predetermined range between the maximum inspection position and the minimum inspection position with use of the magnet clamps 32, after the movable base plate 31 is moved to a desired position, the movable base plate 31 can be easily fixed to the base by the magnet clamps 32. Moreover, the fixing of the movable base plate 31 to the base can be easily released. As described above, as the position of the movable base plate 31 can be changed, the exciter 10 can be easily changed to a position corresponding to the interval between the wheels W of the vehicle V to be inspected.

The embodiment illustrates an example of using the movable base plate 31 as the moving member. However, the moving member of the disclosure is not limited thereto and may be any member which is provided on the upper surface of the base to be movable within a predetermined range of the upper surface and has the operation machine arranged on the upper side. For example, a circular plate member or a plate-shaped member having a polygonal shape in the plan view may be used as the moving member.

The embodiment illustrates an example of using the exciter 10 as the operation machine. However, the operation machine of the disclosure is not limited thereto and may be any device arranged on the upper side of the moving member. For example, a rotational operation type operation machine or the like may be used as the operation machine.

Further, the embodiment illustrates an example of using the pulley mechanism 40 as the moving mechanism. However, the moving mechanism of the disclosure is not limited thereto and may be any mechanism having an elongated member, a plurality of first rotating members, a second rotating member, and a driving mechanism. For example, a mechanism combining a chain, a sprocket, and an electric motor may be used as the moving mechanism.

Furthermore, the embodiment illustrates an example of using the toothed belt 45 as the elongated member. However, the elongated member of the disclosure is not limited thereto and may be any member that has flexibility and has two ends connected to the moving member. For example, a wire or a chain may be used as the elongated member.

In addition, the embodiment illustrates an example that two ends of the toothed belt 45 which is the elongated member are connected to one connecting pin 31*a* of the movable base plate 31. However, two ends of the toothed belt 45 may be connected to two connecting portions of the movable base plate 31 that are separated from each other. In that case, four sets of two connecting portions are arranged in a positional relationship of a quadrangular shape in the plan view.

Further, the embodiment illustrates an example of using the driving pulley 41 and the two driven pulleys 43 as the plurality of first rotating members. However, the plurality of first rotating members of the disclosure are not limited thereto and may be members that are arranged outside a predetermined range of the moving member on the base and wound with the elongated member to be rotatable around the axis line extending in the vertical direction.

For example, a plurality of sprockets or a plurality of gears may be used as the plurality of first rotating members. When a plurality of sprockets are used, a chain may be used as the elongated member. Further, the number of the plurality of first rotating members is not limited to three, and may be two or four or more. For example, two toothed pulleys may be used as the plurality of first rotating members, and at least one of the two toothed pulleys may be driven by the driving mechanism 46.

Moreover, the embodiment illustrates an example of using the idler roller as the second rotating member. However, the second rotating member of the disclosure is not limited thereto and may be any member that is provided to be rotatable around the axis line extending in the vertical direction and holds the elongated member with each of the plurality of first rotating members. For example, a sprocket or a toothed pulley may be used as the second rotating member.

In addition, the embodiment illustrates an example of using the driving mechanism 46 combining an electric motor and a gear mechanism as the driving mechanism. However, the driving mechanism of the disclosure is not limited thereto and may be any mechanism that moves the moving member within the predetermined range via each elongated member by rotationally driving at least one of the plurality of first rotating members around the axis line, and stops the moving member by stopping the rotational driving. For example, an electric motor may be used directly, or a mechanism combining a linear actuator and a gear mechanism may be used as the driving mechanism.

The embodiment illustrates an example of using the magnet clamp 32 as the magnet mechanism. However, the magnet mechanism of the disclosure is not limited thereto and may be any mechanism capable of fixing the moving member of a magnetic substance to the base at any position within the predetermined range and capable of releasing the fixing. For example, a solenoid mechanism may be used as the magnet mechanism.

What is claimed is:

1. A position changing device changing a planar position of an operation machine, the position changing device comprising:
   a base having a planar upper surface;
   a moving member provided on the upper surface of the base to be movable within a predetermined range of the upper surface, and the operation machine being arranged at an upper portion of the moving member; and
   four moving mechanisms arranged on the base in a positional relationship of a quadrangular shape in a plan view to surround the moving member, and moving the moving member within the predetermined range,
   wherein each of the four moving mechanisms comprises:
   an elongated member having flexibility, and two ends of the elongated member being connected to the moving member;
   a plurality of first rotating members arranged outside the predetermined range of the moving member on the base and wound with the elongated member, and the plurality of first rotating members being rotatable around an axis line extending in a vertical direction;
   a second rotating member provided to be rotatable around the axis line extending in the vertical direction, and holding the elongated member between the second rotating member and each of the plurality of first rotating members; and
   a driving mechanism moving the moving member within the predetermined range via the elongated member by rotationally driving at least one of the plurality of first rotating members around the axis line, and stopping the moving member by stopping rotational driving.

2. The position changing device according to claim 1, wherein the plurality of first rotating members comprise three first rotating members that are spaced from each other and arranged to face the moving member, and
   the first rotating member located at a center of the three first rotating members holds the elongated member with two second rotating members respectively arranged on the side of remaining two first rotating members, and is rotationally driven by the driving mechanism.

3. The position changing device according to claim 1, wherein each of the plurality of first rotating members comprises a toothed pulley, the elongated member comprises a toothed belt that meshes with the toothed pulley, and the second rotating member comprises a roller holding the toothed belt between the roller and the toothed pulley.

4. The position changing device according to claim 1, wherein the moving member comprises a magnetic substance, and the position changing device further comprises a magnet mechanism provided on the base and fixing the moving member to the base at any position within the predetermined range with a magnetic force and releasing the fixing.

5. The position changing device according to claim 1, wherein the operation machine is an exciter that excites each of a plurality of wheels in a vehicle comprising the plurality of wheels, and the exciter is changed to a position corresponding to an interval between the plurality of wheels.

\* \* \* \* \*